United States Patent
Wu

(10) Patent No.: US 7,543,983 B2
(45) Date of Patent: Jun. 9, 2009

(54) DEVICE FOR MEASURING TEMPERATURE OF HEAT PIPE

(75) Inventor: Cheng-Shiun Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 209 days.

(21) Appl. No.: 11/309,589

(22) Filed: Aug. 28, 2006

(65) Prior Publication Data

US 2007/0153872 A1 Jul. 5, 2007

(30) Foreign Application Priority Data

Dec. 30, 2005 (CN) ................... 2005 1 0121403

(51) Int. Cl.
*G01K 1/16* (2006.01)
*G01K 7/04* (2006.01)

(52) U.S. Cl. ............... 374/179; 374/148; 374/141

(58) Field of Classification Search ............ 374/4, 374/5, 29, 30, 31, 32, 43, 44, 57, 152, 153, 374/141, 145, 147, 208, 179, 148; 73/866.5, 73/865.6, 865.9; 136/200

See application file for complete search history.

(56) References Cited

U.S. PATENT DOCUMENTS

| 4,297,668 | A | * | 10/1981 | Place | 337/365 |
| 5,172,979 | A | * | 12/1992 | Barkley et al. | 374/147 |
| 5,248,198 | A | * | 9/1993 | Droege | 374/7 |
| 5,495,769 | A | * | 3/1996 | Broden et al. | 73/718 |
| 5,980,102 | A | * | 11/1999 | Stulen et al. | 374/45 |
| 6,257,758 | B1 | * | 7/2001 | Culbertson | 374/120 |
| 6,334,707 | B1 | * | 1/2002 | Ku | 374/208 |
| 6,550,962 | B1 | * | 4/2003 | Yang et al. | 374/147 |
| 6,779,919 | B1 | * | 8/2004 | Staniforth et al. | 374/147 |
| 7,147,368 | B2 | * | 12/2006 | Chien | 374/147 |
| 7,445,385 | B2 | * | 11/2008 | Lin | 374/147 |
| 2005/0220168 | A1 | | 10/2005 | Hai | |
| 2007/0006995 | A1 | * | 1/2007 | Lin | 165/104.26 |
| 2007/0116087 | A1 | * | 5/2007 | Hsu | 374/147 |
| 2007/0237202 | A1 | * | 10/2007 | Li | 374/147 |

FOREIGN PATENT DOCUMENTS

| GB | 2034111 A | * | 5/1980 |
| JP | 57086736 A | * | 5/1982 |
| JP | 61126440 A | * | 6/1986 |
| JP | 61269035 A | * | 11/1986 |
| JP | 06137955 A | * | 5/1994 |

* cited by examiner

*Primary Examiner*—Gail Verbitsky
(74) *Attorney, Agent, or Firm*—Frank R. Niranjan

(57) ABSTRACT

A device for measuring a temperature of a heat pipe includes at least one measuring assembly, a block and at least one base. The measuring assembly includes a resilient member with one end thereof mounted on the base, a supporting member coupled to the other end of the resilient member, and a thermocouple arranged on the supporting member. The block defines a through hole configured for receiving the heat pipe inserted therein, and at least one opening in communication with the through hole. The at least one opening is configured for receiving the corresponding at least one measuring assembly. The device can improve the accuracy of temperature measuring of the outer surface of the heat pipe.

11 Claims, 2 Drawing Sheets

DEVICE FOR MEASURING TEMPERATURE OF HEAT PIPE

FIELD OF THE INVENTION

The present invention relates to measuring devices for heat pipes, and more particularly to a temperature measuring device which can accurately measure the temperature of the outer surface of the heat pipe.

DESCRIPTION OF RELATED ART

Heat pipes can be described as closed devices employing evaporation-condensation cycles for transporting heat from a hot location to a heat dispersal area, and using capillary structures or wicks for return of the condensate. These devices often have the shape of a pipe or tube that is closed at both ends. However, the term "heat pipe" can also be used in a more general sense to refer to devices of any shape size or make-up that are designed to function as so described.

The heat pipe is a highly efficient heat transfer system and has been broadly used in spacecraft, energy recuperation, power generation, chemical engineering, electronics cooling, air conditioning, engine cooling and other applications. However, the heat pipe has its limits, limitations include capillary pumping limitations, nucleate boiling limitations, entrainment limitations and so on. So, measuring heat transfer characteristics of the heat pipe in a manner so as to determine these limits is necessary.

One method for measuring heat transfer characteristics of the heat pipe involves measuring the temperature of the outer surface of the heat pipe. In this method, a thermocouple is attached to the outer surface of the heat pipe by adhesive tape so as to measure the temperature of the outer surface of the heat pipe. Because the adhesive tape usually cannot ensure a close contact between the thermocouple and the outer surface of the heat pipe and it is difficult to know whether the thermocouple is close enough to the outer surface of the heat pipe, the temperature measured by the thermocouple may be different to the actual temperature.

What is needed, therefore, is a device for measuring temperature which can improve the accuracy of temperature measurement of the outer surface of the heat pipe.

SUMMARY OF INVENTION

In accordance with one embodiment, a device for measuring a temperature of a heat pipe includes at least one base, at least one measuring assembly and a block. The measuring assembly includes a resilient member with one end thereof mounted on the base, a supporting member coupled to the other end of the resilient member, and a thermocouple arranged on the supporting member. The block defines a through hole configured for receiving the heat pipe inserted therein, and at least one opening in communication with the through hole. The at least one opening is configured for receiving the corresponding at least one measuring assembly.

In accordance with an embodiment, a device for measuring a temperature of a heat pipe includes at least one base, a block and a plurality of measuring assemblies. The block has a through hole configured for receiving the heat pipe inserted therein, and a plurality of openings in communication with the through hole. Each measuring assembly includes a thermocouple configured for insertion into the corresponding opening and abutting against the heat pipe, and a resilient member mounted on the at least one base, the resilient member being configured for pressing the thermocouple towards the heat pipe.

Other advantages and novel features will become more apparent from the following detailed description of present device for measuring temperature of heat pipes, when taken in conjunction with the accompanying drawings.

BRIEF DESCRIPTION OF THE DRAWINGS

Many aspects of the present device for measuring temperature of heat pipes can be better understood with reference to the following drawings. The components in the drawings are not necessarily drawn to scale, the emphasis instead being placed upon clearly illustrating the principles of the present device for measuring temperature of heat pipes. Moreover, in the drawings, like reference numerals designate corresponding parts throughout the several views.

DETAILED DESCRIPTION

Embodiments of the present device for measuring temperature of heat pipes will now be described in detail below and with reference to the drawings.

Figure 1:
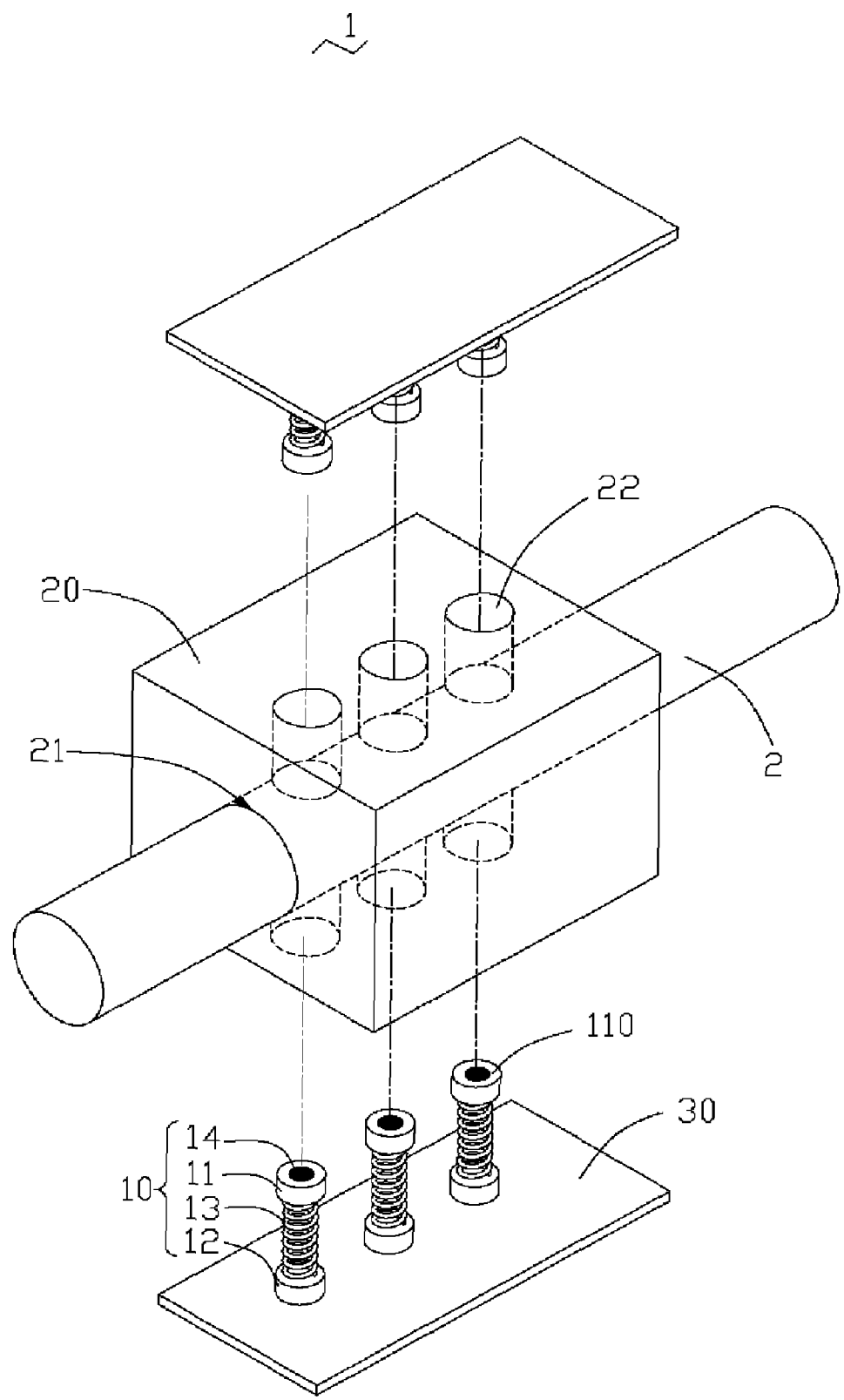
FIG. 1 is a schematic, isometric view of a device for measuring a temperature of a heat pipe according to a first embodiment.

Referring to FIG. 1, a device 1 for measuring temperature of heat pipe according to a first embodiment includes at least one measuring assembly 10, a block 20 and at least one base 30.

The block 20 defines a through hole 21 configured for receiving the heat pipe 2 inserted therein, and at least one opening 22 in communication with the through hole 21. The block may be configured to be movable relative to the heat pipe received therein. By doing so, temperatures at different locations on the heat pipe can be readily measured. The at least one opening 22 is configured for receiving the corresponding at least one measuring assembly 10. The shape of the through hole 21 is determined to the shape of the heat pipe 2. The shape of the through hole 21 can be cuboid or columned. The shape of the opening 22 can be designed as cuboid or columned according to the shape of the measuring assembly 10. In present embodiment, the block 20 defines six openings 22 symmetrically arranged at opposite sides of the block 20. The openings 22 at the same side of the block 20 are spaced at a uniform spacing. Preferably, the central axes of the openings 22 are coplanar, and a plane defined by the central axes of the openings 22 is parallel with a central axis of the through hole 21. Preferably, the central axes of the openings 22 and the central axis of the through hole 21 are coplanar. In to allow greater ease of contact between the heat pipe 22 and the measuring assembly 10, the openings 22 can be designed perpendicular to the through hole 21. The shape of the block 20 can be designed as cuboid for the block 20 easy to be placed. The block 20 is configured to be movable relative to the heat pipe 2 received therein.

In present embodiment, there are two bases 30 in the device 1. Each base 30 has three measuring assemblies 10 at the same side of the block 20 mounted on. Preferably, the three measuring assemblies 10 are perpendicular to the base 30. The base 30 can be moved along a direction parallel with the central axis of openings 22.

In present embodiment, the device 1 has six measuring assemblies 10 respectively received in the six openings 22. Each measuring assembly 10 includes a pressing block 12 attached to the base 30, a resilient member 13 with one end coupled to the pressing block 12, a supporting member 11 coupled to the other end of the resilient member 13, and a thermocouple 14 arranged on a surface 110 of the supporting member 11 away from the resilient member 13.

The supporting member 11 can be made of an adiabatic material, such as Bakelite. The surface 110 of the supporting member 11 can be designed as a planar surface or an arcuate surface according to the shape of the heat pipe 2. The resilient member 13 can be a spring or an elastic rubber.

In the measuring process of the heat pipe 2, the device 1 is used for measuring the temperature of the outer surface of the heat pipe 2. In order to measure the temperature of the outer surface of heat pipe 2, following steps need to be performed: inserting the heat pipe 2 into the through hole 21 of the block 20; moving the base 30 to insert the measuring assemblies 10 into the openings 22; and keeping the resilient member 13 in the compressed state. The measuring assemblies 10 can intimately contact with the outer surface of heat pipe 2 by keep the resilient member 13 in the compressed state, thereby improving the accuracy of the temperature measuring for the outer surface the heat pipe 2.

Figure 2:
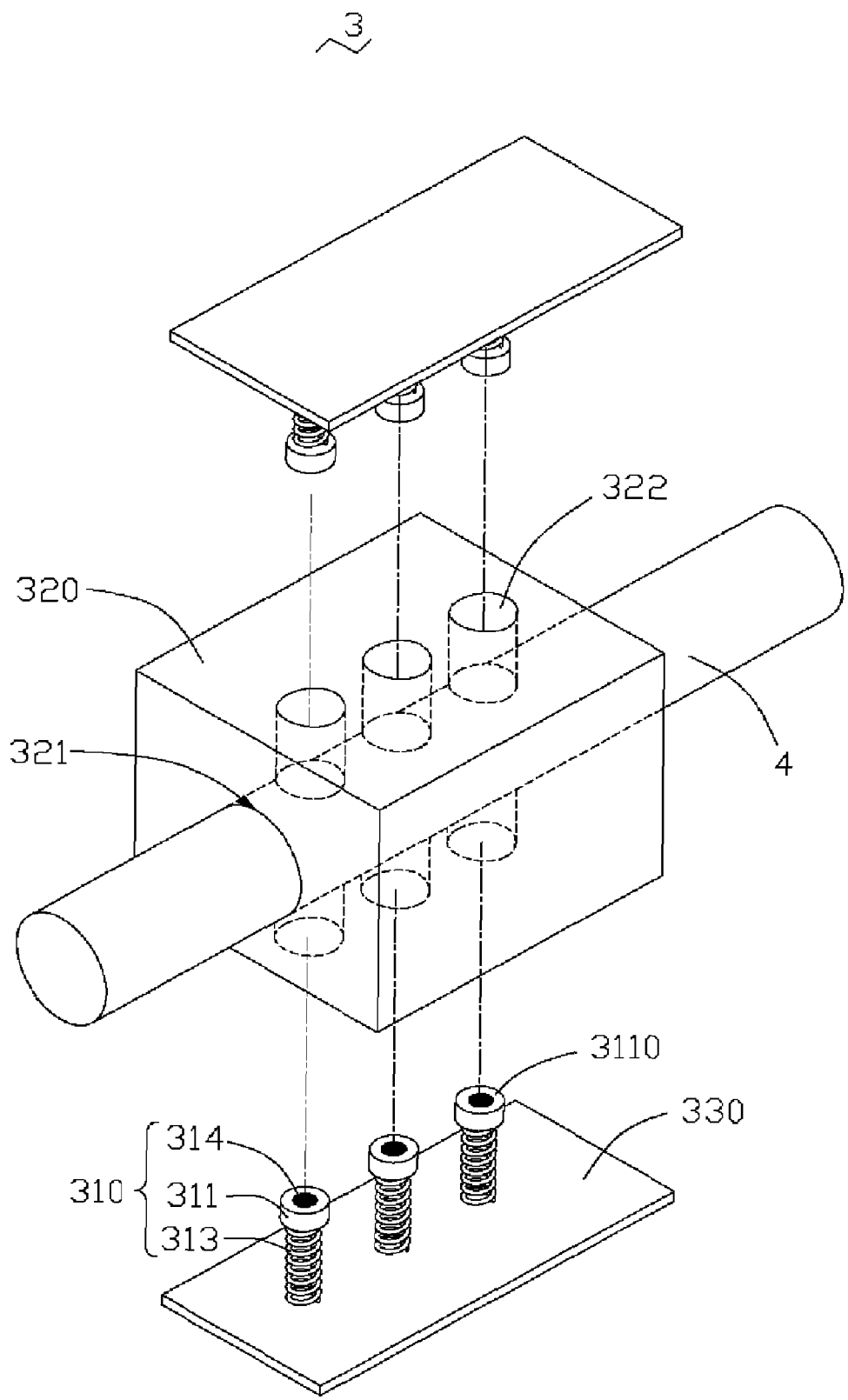
FIG. 2 is a schematic, isometric view of a device for measuring a temperature of a heat pipe according to a second embodiment.

Referring to FIG. 2, a device 3 for measuring temperature of heat pipe according to a second embodiment includes at least one measuring assembly 310, a block 320 and at least one base 330. The block 320 defines a through hole 321 configured for receiving the heat pipe 4 and at least one opening 322 in communication with the through hole 321, the opening 322 is configured for receiving the corresponding at least one measuring assembly 310. Each base 330 has at least one measuring assembly 310 at the same side of the block 320 mounted on. The measuring assembly 310 includes a resilient member 313 with one end thereof mounted on the base 330, a supporting member 311 coupled to the other end of the resilient member 313 and a thermocouple 314 arranged on a surface 3110 of the supporting member 311 away from the resilient member 313.

As stated above, in the present device for measuring temperature of heat pipes, the measuring assembly can intimately contact with the outer surface of the heat pipe by keep the resilient member in the compressed state and reduce the thermal resistance between the outer surface of the heat pipe and the thermocouple, accordingly, can improve the accuracy of the temperature measuring. Furthermore, the length of the resilient member compressed is easy to observe and easy to standardize for the measurement of many heat pipes.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A device for measuring a temperature of a heat pipe, comprising:
    at least one base;
    at least one measuring assembly comprising:
        a resilient member with one end thereof mounted on the base,
        a supporting member coupled to the other end of the resilient member, and
        a thermocouple arranged on the supporting member; and
    a block defining a through hole configured for receiving the heat pipe inserted therein, and a plurality of openings in communication with the through hole, the openings being configured for receiving the at least one measuring assembly and symmetrically arranged at opposite sides of the block.

2. The device as claimed in claim 1, wherein the openings at the same side of the block are spaced at regular uniform distances.

3. A device for measuring a temperature of a heat pipe, comprising:
    at least one base;
    at least one measuring assembly comprising:
        a resilient member with one end thereof mounted on the base,
        a supporting member coupled to the other end of the resilient member, and
        a thermocouple arranged on the supporting member; and
    a block defining a through hole configured for receiving the heat pipe inserted therein, and a plurality of openings in communication with the through hole, the openings being configured for receiving the at least one measuring assembly, and central axes of the openings being coplanar.

4. The device as claimed in claim 3, wherein a plane defined by the central axes of the openings is parallel with a central axis of the through hole.

5. The device as claimed in claim 3, wherein the central axes of the openings and the central axis of the through hole are coplanar.

6. The device as claimed in claim 3, wherein the resilient member is coupled to the base by a pressing block attached to the base.

7. The device as claimed in claim 3, wherein the resilient member is selected from the group consisting of a spring and an elastic rubber.

8. The device as claimed in claim 3, wherein a surface of the supporting member away from the resilient member is one of a planar surface and an arcuate surface.

9. The device as claimed in claim 1, wherein the resilient member is selected from the group consisting of a spring and an elastic rubber.

10. The device as claimed in claim 1, wherein a surface of the supporting member away from the resilient member is one of a planar surface and an arcuate surface.

11. The device as claimed in claim 1, wherein the resilient member is coupled to the base by a pressing block attached to the base.

* * * * *